(12) United States Patent
Sinha

(10) Patent No.: US 8,824,302 B2
(45) Date of Patent: Sep. 2, 2014

(54) PROXY MAINTENANCE ENDPOINT AT PROVIDER EDGE SWITCH

(75) Inventor: Abhishek Sinha, Woodland Hills, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 126 days.

(21) Appl. No.: 13/555,473

(22) Filed: Jul. 23, 2012

(65) Prior Publication Data

US 2014/0022886 A1 Jan. 23, 2014

(51) Int. Cl.
*G01R 31/08* (2006.01)
*H04L 12/24* (2006.01)
*H04L 12/26* (2006.01)

(52) U.S. Cl.
CPC ........... *H04L 41/06* (2013.01); *H04L 43/10* (2013.01)
USPC .......................................... 370/236; 370/242

(58) Field of Classification Search
CPC . H04L 43/08; H04L 43/0805; H04L 43/0811; H04L 43/10; H04L 41/06
USPC ................... 370/241, 241.1, 242, 236, 236.2
See application file for complete search history.

(56) References Cited

U.S. PATENT DOCUMENTS

| | | | | |
|---|---|---|---|---|
| 8,411,701 | B2 * | 4/2013 | Kini et al. | 370/467 |
| 2006/0159008 | A1 * | 7/2006 | Sridhar et al. | 370/216 |
| 2009/0109861 | A1 * | 4/2009 | Kini et al. | 370/242 |
| 2011/0249567 | A1 * | 10/2011 | Kini et al. | 370/241.1 |
| 2013/0229924 | A1 * | 9/2013 | Salam et al. | 370/244 |

\* cited by examiner

*Primary Examiner* — Kerri Rose
(74) *Attorney, Agent, or Firm* — Garlick & Markison

(57) ABSTRACT

A proxy maintenance endpoint is configured within a provider edge switch in a service provider network. Maintenance endpoints within customer premises equipment register with the proxy maintenance endpoint and transmit Connectivity Fault Management (CFM) frames to the proxy maintenance endpoint. The proxy maintenance endpoint encapsulates the CFM frames into a CFM report and transmits the CFM report to remote proxy maintenance endpoints for subsequent distribution to maintenance endpoints within remote customer premises equipment.

20 Claims, 9 Drawing Sheets

CCM Frame 400

| | | |
|---|---|---|
| 410 | Common CFM Header | Offset 1-4 bytes |
| 420 | Number of encoded messages | 5-8 |
| | Sequence Number-1 | 9-12 |
| | Maintenance Association End Point Identifier-1 | 13-14 |
| | Maintenance Association Identifier (MAID)-1 | 15-62 |
| | Defined by ITU-T Y.1731-1 | 73-78 |
| | Reserved for definition in future versions of the protocol* -1 | |
| | Optional CCM TLVs-1 | First TLV Offset + 5 |
| | End TLV (0)-1 | |
| | Sequence Number-2 | 9-12 |
| | Maintenance Association End Point Identifier-2 | 13-14 |
| | Maintenance Association Identifier (MAID)-2 | 15-62 |
| | Defined by ITU-T Y.1731-2 | 73-78 |
| | Reserved for definition in future versions of the protocol* -1 | |
| | Optional CCM TLVs-2 | First TLV Offset + 5 |
| | End TLV (0)-2 | |

*FIG. 4A*

Common CFM Header 410

| | | |
|---|---|---|
| | MD level | 1 (high-order 3 bits) |
| | Version | 1 (low-order 5 bits) |
| 430 | Opcode | 2 |
| | Flags | 3 |
| | First TLV offset | 4 |
| | Varies with value of opcode | 5 |
| | End TLV (0) | First TLV Offset + 5 |

*FIG. 4B*

OpCode Field range assignments in the CFM common header

| Opcode | Value |
|---|---|
| Reserved for IEEE 802.1 | 0 |
| Continuity Check Message (CCM) | 1 |
| Loopback Reply (LBR) | 2 |
| Loopback Message (LBM) | 3 |
| Linktrace Reply (LTR) | 4 |
| Linktrace Message (LTM) | 5 |
| Continuity Check Message (CCM) -Proxy MEP encoded | 6 |
| Reserved for IEEE 802.1 | 7-31 |
| Defined by ITU-T Y.1731 | 32-63 |
| Reserved for IEEE 802.1 | 64-255 |

*FIG. 4C*

PROXY MAINTENANCE ENDPOINT AT PROVIDER EDGE SWITCH

BACKGROUND OF THE INVENTION

1. Technical Field of the Invention

The present invention relates in general to Ethernet Operations, Administration and Management (OAM), and in particular, to Connectivity Fault Management (CFM) in Ethernet OAM.

2. Description of Related Art

Ethernet OAM provides protocols for installing, monitoring and troubleshooting Ethernet metropolitan area networks (MANs) and Ethernet wide area networks (WANs). Several different standards bodies have developed working protocols for Ethernet OAM. For example, the Institute of Electrical and Electronics Engineers (IEEE) has produced the IEEE 802.1ag standard, which defines Connectivity Fault Management (CFM) in enterprise and carrier networks. Similarly, the International Telecommunication Union Telecommunication Standardization Sector (ITU-T) has produced the Y.1731 standard, which defines both fault management and performance monitoring in carrier networks.

The IEEE 802.1ag standard further partitions the network into hierarchical maintenance domains (MDs) and defines roles for maintenance endpoints (MEPs) and maintenance intermediate points (MIPs) within each domain. For example, a customer (higher) level domain includes maintenance endpoints (MEPs) within customer premises equipment and maintenance intermediate points (MIPs) within provider edge switches and core operator switches, while a provider (lower) level domain includes MEPs within provider edge switches and MIPs within core operator switches. Thus, the lower level domain MEPs are nested with the higher level domain MIPs within the provider edge switches.

Currently, the Ethernet OAM Protocol, as described in the IEEE 802.1ag standard and similarly described in the ITU-T Y.1731 standard, includes the following primitives: Fault Detection, Fault Verification and Fault Isolation. Fault Detection is supported using CFM Continuity Check Messages (CCMs), which are "heartbeat" messages issued periodically by maintenance endpoints (MEPs) in the network. CCMs allow MEPs to detect loss of service connectivity amongst themselves, enable MEPs to discover other MEPs within an Ethernet maintenance domain (MD) and enable maintenance intermediate points (MIPs) to discover MEPs.

Fault Verification is supported using CFM Loop-Back messages, which are transmitted by MEPs at the request of an administrator to verify connectivity to a particular maintenance point (MEP or MIP). Fault Isolation is supported using link trace messages, which are transmitted by a MEP at the request of an administrator to track the path (hop-by-hop) to a destination MEP. Link trace allows the transmitting MEP to discover connectivity data about the path.

The increasing deployment of Carrier Ethernet in metropolitan areas, such as residential complexes, shopping malls and small businesses, has created several challenges for service providers. To facilitate Metro Ethernet services to customers, service providers have been installing pure Ethernet-based devices on-site as customer premises equipment (CPE). With the proliferation of these Ethernet-based devices, the scalability of Ethernet OAM (especially in the higher customer domains) has become an issue. In particular, since IEEE 802.1ag has recommended using CFM as a base primitive to support Fault Detection, the increasing deployment of Carrier Ethernet in Metro networks has resulted in an increased number of CFM frames traversing the Metro cloud and an increased cost and complexity of Ethernet-based CPE due to the required hardware and software necessary to support the CFM traffic. The high cost of such Ethernet-based CPE necessarily increases the overall cost of deployment.

To reduce the cost, a Metro Ethernet service provider may desire to support only Fault Verification and Fault Isolation, but not Fault Detection, since the Fault Detection primitives (e.g., CCM) have substantial overhead, and therefore do not scale well. However, the current standard for Ethernet OAM in IEEE 802.1ag and ITU-T Y.1731 requires service providers to implement Fault Detection in Metro networks. Therefore, what is needed is an enhancement to Ethernet OAM to reduce the cost and complexity of running CFM in Metro networks.

SUMMARY OF THE INVENTION

An apparatus, in one embodiment, includes an interface coupled to a service provider network via an Ethernet link and a processor for registering with a designated proxy maintenance endpoint within the service provider network and transmitting Connectivity Fault Management (CFM) frames to the designated proxy maintenance endpoint. The processor further receives a CFM report from the designated proxy maintenance endpoint via the interface, in which the CFM report includes CFM information associated with a plurality of remote customer premises equipment. For example, in one embodiment, the CFM frames are continuity check messages.

In another embodiment, the apparatus further maintains a list of the remote customer premises equipment and the processor further performs an audit check on the list using the CFM report to remove remote customer premises equipment from the list that are not included in the CFM report and add remote customer premises equipment to the list that are included in the CFM report.

In yet another embodiment, the apparatus is configured to not perform any fault detection based on loss of CFM frames from individual ones of the plurality of remote customer premises equipment. However, the apparatus may run link trace or loopback to remote customer premises equipment using the CFM report.

In an exemplary embodiment, the apparatus is a customer premises equipment and the Ethernet link is a metro link that couples the customer premises equipment to a provider edge switch including the designated proxy maintenance endpoint.

A provider edge switch, in another embodiment, includes an interface coupled to a plurality of customer premises equipment via a downstream Ethernet link to receive respective Connectivity Fault Management (CFM) frames from the customer premises equipment. The interface is further coupled to a service provider network via an upstream Ethernet link. The provider edge switch further includes a memory maintaining a proxy maintenance endpoint algorithm and a processor for executing the proxy maintenance endpoint algorithm to: (1) create a designated proxy maintenance endpoint for the plurality of customer premises equipment; (2) generate a CFM report and encapsulate at least one of the CFM frames into the CFM report; and (3) transmit the CFM report to remote proxy maintenance endpoints within the service provider network via the upstream Ethernet link.

In one embodiment, the provider edge switch further receives an additional CFM report from one of the remote maintenance endpoints via the upstream Ethernet link. The additional CFM report includes encapsulated CFM information associated with a plurality of remote customer premises equipment. The processor further de-capsulates the encapsulated CFM information to produce de-capsulated CFM information and provides the de-capsulated CFM information to the plurality of customer premises equipment via the downstream Ethernet link. In a further embodiment, the memory includes a list of the remote proxy maintenance endpoints and the plurality of remote customer premises equipment associated with each of the remote maintenance endpoints. In this embodiment, the processor updates the list based on the additional CFM report.

In an exemplary embodiment, the CFM report includes a header having an opcode indicating that the CFM report is a continuity check message containing encapsulated CFM frames. The header may further indicate a number of encapsulated CFM frames.

In another exemplary embodiment, the processor transmits the CFM report at a configurable frequency. For example, the processor can transmit the CFM report at a reduced frequency (e.g., less than 10 packets per second) compared to other management endpoints at the customer domain level. The processor may further receive the CFM frames from the plurality of customer premises equipment via the downstream Ethernet link at respective configurable frequencies such that timer validation checks are not performed on the customer premises equipment.

BRIEF DESCRIPTION OF THE DRAWINGS

A more complete understanding of the present invention may be obtained by reference to the following detailed description when taken in conjunction with the accompanying drawings wherein:

FIGS. 4A-4C illustrate an exemplary format of a CFM report generated by a proxy maintenance endpoint, in accordance with embodiments of the present invention;

DETAILED DESCRIPTION OF THE DRAWINGS

Embodiments of the present invention provide an enhancement to Ethernet OAM protocols, as described in IEEE 802.1ag and ITU-T Y.1731, to support proxy maintenance endpoints (MEPs) to reduce the CFM overhead for the higher domain Ethernet devices as well reduce the amount of OAM traffic carried in the lower domains. The proxy MEPs are hosted on devices at the boundary between two Ethernet domains (e.g., customer domain and provider domain) and act as proxies to downstream client MEPs. In an exemplary embodiment, the proxy MEPs are implemented on provider edge bridges/switches that are coupled to customer devices, such as customer edge bridges/switches and customer premises equipment (CPE).

The higher domain client MEPs (e.g., within the customer devices) each generate respective periodic CFM frames (e.g., CCMs) at a slow rate to their designated proxy MEP. The designated proxy MEP consolidates the received CFM frames into a CFM report and transmits the CFM report across the lower domain to remote proxy MEPs. The designated proxy MEP further receives CFM reports from the remote proxy MEPs and forwards the CFM reports to their downstream client MEPs. Based on the received CFM reports forwarded by their designated proxy MEP, the client MEPs can discover remote MEPs and run other Ethernet OAM primitives, such as fault verification, fault isolation and performance monitoring.

Figure 1:
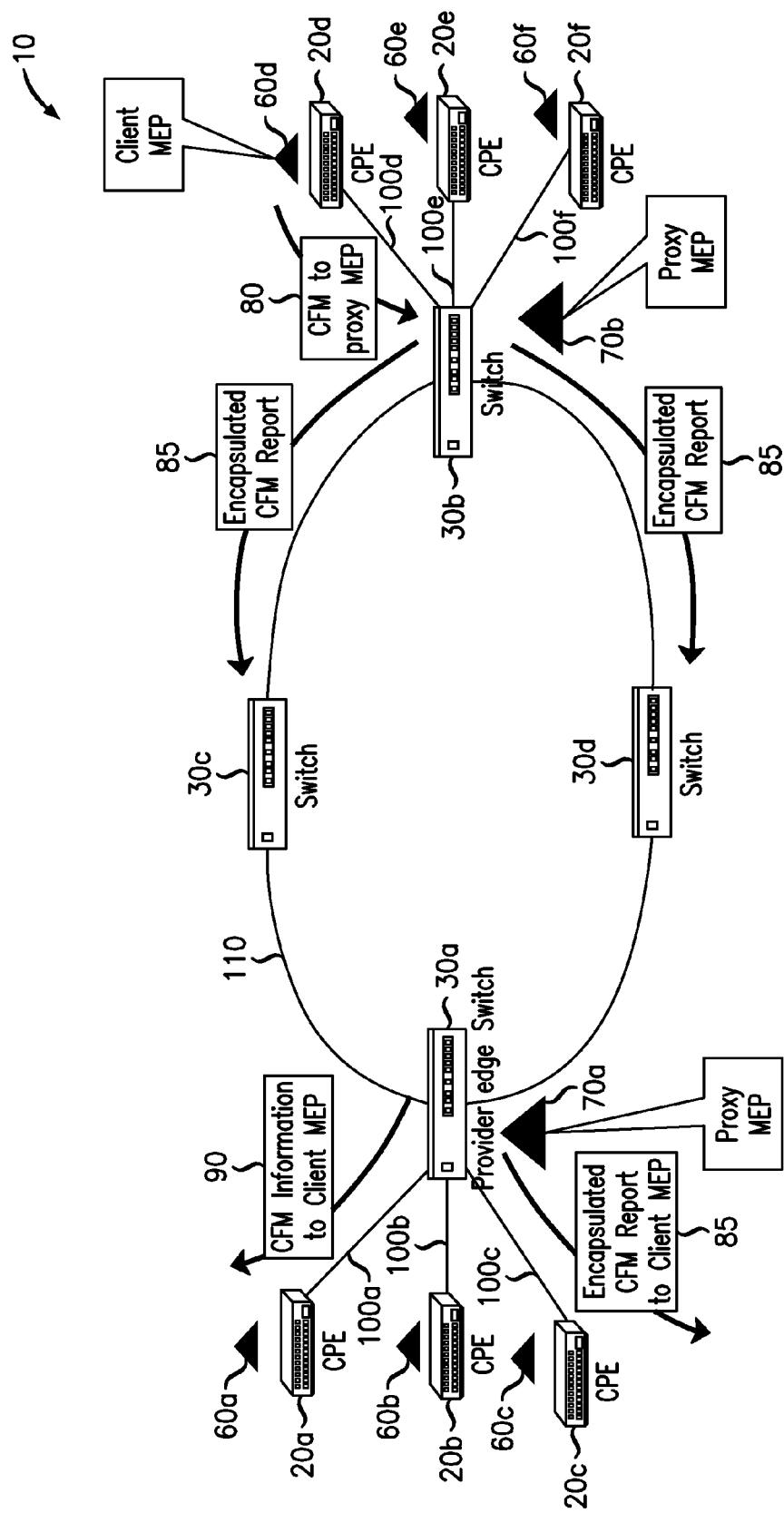
FIG. 1 illustrates an exemplary Ethernet metropolitan area network (MAN) implementing Ethernet OAM protocols using proxy maintenance endpoints, in accordance with embodiments of the present invention.

Referring now to FIG. 1, there is illustrated an exemplary Ethernet metropolitan area network (MAN) 10 implementing enhanced Ethernet OAM protocols, in accordance with embodiments of the present invention. The Ethernet MAN 10 may service, for example, one or more residential complexes, malls, small/medium businesses, college campuses and/or other type(s) of facilities/customers that may span a metropolitan area or campus. The Ethernet MAN 10 includes a plurality of provider edge switches 30a-30d, each coupled to a plurality of respective customer premises equipment (CPE) 20a-20f. For example, CPE 20a-20f may include various customer devices, such as customer bridges/switches, wireless routers, wireless base stations, computers, set top boxes, VoIP phones and any other customer equipment having an Ethernet connection to a provider edge switch 30a-30d.

The provider edge switches 30a-30d are located at the boundary between the customer domain and the provider domain, such that the provider edge switches 30a-30d are coupled to the CPE 20a-20f via respective Ethernet links 100a-100f and to a service provider network of the MAN 10 via additional Ethernet links 110. The service provider network includes the provider edge switches 30a-30f and any core operator bridges/switches (not shown) within the MAN 10. In one embodiment, the provider edge switches 30a-30d are each coupled to a respective local area network (LAN) including one or more CPE 20a-20f, and operate to couple the LANs to the service provider network.

Each CPE 20a-20f hosts a respective client maintenance endpoint (MEP) 60a-60f, which are software programs that run Ethernet OAM primitives (algorithms), such as fault detection, fault verification and fault isolation. However, in accordance with embodiments of the present invention, the client MEPs 60a-60f run a modified fault detection primitive that reduces the number of Ethernet OAM frames traversing the MAN 10.

In addition, the provider edge switches (e.g., switches 30a and 30b) each host a respective proxy MEP 70a and 70b for the client MEPs 60a-60f. For example, proxy MEP 70a serves as a higher (customer) domain proxy for client MEPs 60a-60c, while proxy MEP 70b serves as a higher domain proxy for client MEPs 60d-60f. The proxy MEPs 70a and 70b operate with the lower (provider) domain MEPs on the provider edge switches 30a and 30b to facilitate the enhanced Ethernet OAM protocol. In one embodiment, the proxy MEPs 70a and 70b are incorporated into the lower domain MEPs. For example, the proxy MEP functionality and lower domain MEP functionality can be included in a single provider level domain MEP software program. In another embodiment, the proxy MEPs 70*a* and 70*b* are separate from the lower domain MEPs (e.g., separate software programs).

In an exemplary embodiment, the client MEPs 60*a*-60*f* are configured to run an auto-discovery algorithm to register with the respective proxy MEP 70*a* and 70*b* on the provider edge switch 30*a* and 30*b* coupled to the CPE 20*a*-20*f*. For example, client MEPs 60*a*-60*c* register with proxy MEP 70*a*, while client MEPs 60*d*-60*f* register with proxy MEP 70*b*. Once registered, the client MEPs 60*a*-60*f* are configured to send CFM Continuity Check Messages (CCMs) 80 to their proxy MEP 70*a* or 70*b* at a configurable frequency. For example, the frequency can be set on a per client basis (e.g., per CPE 20*a*-20*f*) or on a per provider basis (e.g., per provider edge switch 30*a*-30*d* or per MAN 10). In embodiments in which the frequency is set on a per client basis, the proxy MEPs 70*a* and 70*b* can be further configured to not run timer validation checks for the CCM frames since the CCM frames may arrive at different intervals of time from different client MEPs 60*a*-60*f*. In an exemplary embodiment, the CCM frames are generated and transmitted by the client MEPs 60*a*-60*f* at a reduced frequency (e.g., less than 1,000 packets/second).

The proxy MEPs 70*a* and 70*b* accumulate CCM frames 80 from their registered client MEPs 60*a*-60*f* over a predetermined period of time and encapsulate the CFM information in the received CCM frames 80 into an Encapsulated CFM Report 85. The proxy MEPs 70*a* and 70*b* then transmit the Encapsulated CFM Reports 85 over the lower domain (e.g., through the service provider network) to other proxy MEPs 70*a* and 70*b* within the MAN 10. The Encapsulated CFM Reports 85 are transmitted by the proxy MEPs 70*a* and 70*b* at a configurable frequency that is less than a normal frequency of CCMs. For example, in an exemplary embodiment, a proxy MEP 70*a* can transmit encapsulated CFM reports 85 at a frequency of less than 10 packets per second (e.g., less than ten Encapsulated CFM reports per second). The frequency can be configurable, for example, based on the CCM frequency of the client MEPs 60*a*-60*f* registered with the proxy MEP 70*a*/70*b* and/or based on an operator setting of the proxy MEP 70*a*/70*b* or the MAN 10.

Upon receiving an Encapsulated CFM Report 85 from another proxy MEP (e.g., proxy MEP 70*b*), the proxy MEP (e.g., proxy MEP 70*a*) forwards the Encapsulated CFM Report 85 to its registered client MEPs 60*a*-60*c*. In another embodiment, the proxy MEP 70*a* can extract the CFM information 90 from the Encapsulated CFM Report 85 and transmit the extracted CFM information 90 to its registered client MEPs 60*a*-60*c*.

By utilizing proxy MEPs 70*a*/70*b* at the boundary between domains, the number of Ethernet OAM frames traversing the service provider network is reduced, since the client MEPs do not send the CFM CCM frames across the provider domain, but instead send the frames only to the connected proxy MEPs. In addition, the overhead on the client MEPs is significantly reduced, since the client MEPs do not have to handle each individual CFM CCM frame from each client MEP within the MAN 10. Thus, the hardware and software complexity of the CPE 20*a*-20*f* can be reduced, thereby reducing the cost of deploying Ethernet OAM in Metro networks.

Figure 2:
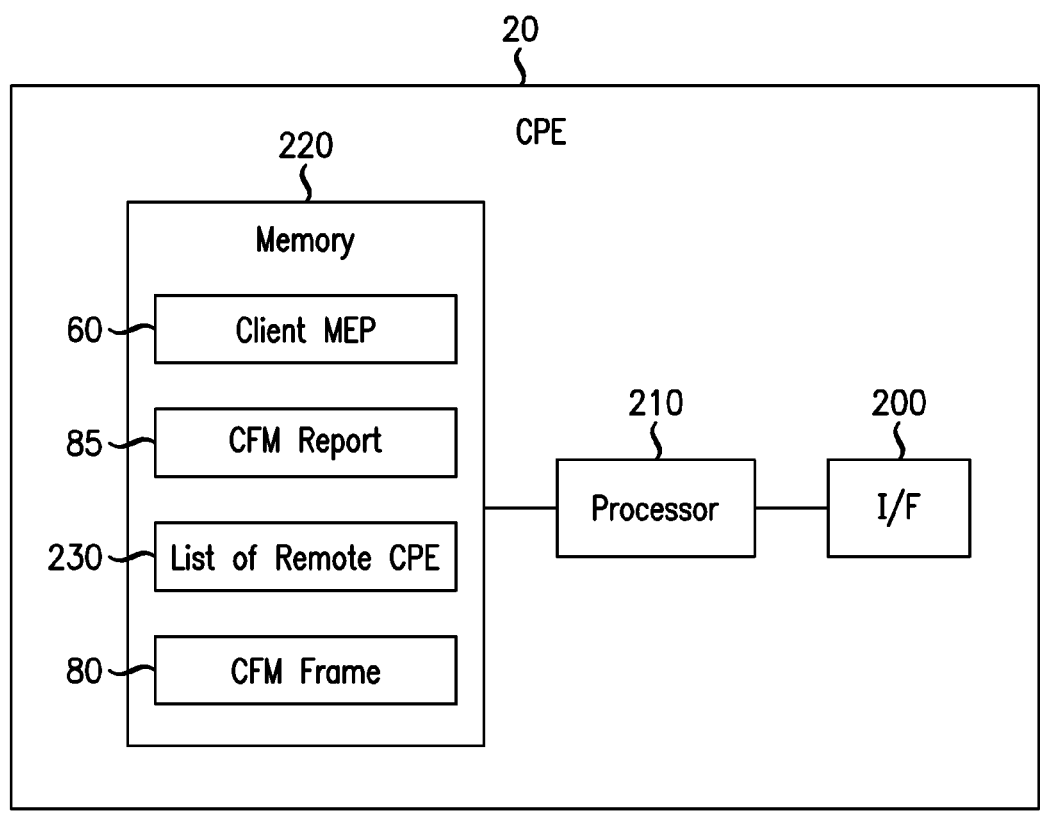
FIG. 2 is a block diagram illustrating exemplary functionality of a client maintenance endpoint within customer premises equipment, in accordance with embodiments of the present invention.

FIG. 2 is a block diagram illustrating exemplary components of a Customer Premises Equipment (CPE) 20, in accordance with embodiments of the present invention. The CPE 20 includes an interface 200, a processor 210 and a memory 220. The interface 200 (e.g., a network interface) is coupled to an Ethernet link to connect to a provider edge switch of a metropolitan area network (MAN).

The memory 220 includes the client maintenance endpoint (MEP) 60 and the processor 210 is coupled to the memory 220 to execute the client MEP 60. For example, the processor 210 can execute the client MEP 60 to register the client MEP with a designated proxy MEP on the provider edge switch coupled to the CPE 20 via interface 200. Once registered, the processor 210 can execute the client MEP 60 to generate and transmit CFM CCM frames 80 to the designated proxy MEP on the provider edge switch via interface 200 at a configurable frequency (e.g., less than 1,000 packets per second). In addition, upon receiving a CFM Report 85 via interface 200, the processor 210 can execute the client MEP 60 to store the CFM Report 85 and/or CFM information within the memory 220.

The CPE 20 may further maintain a list 230 of remote CPE (remote client MEPs) within memory 220. As used herein, the term "remote CPE" refers to any CPE having a client MEP within the MAN. The processor 210 can perform an audit check on the list 230 using the CFM report 85 to remove remote CPEs from the list 230 that are not included in the CFM report 85 and add remote CPEs to the list 230 that are included in the CFM report 85.

The CFM Report 85 can further be utilized by the client MEP 60 to run fault verification and fault isolation algorithms. For example, the client MEP 60 may generate and transmit loop-back and/or link trace messages using the information in the CFM Report 85. However, in an exemplary embodiment, the client MEP 60 does not use the information in the CFM Report 85 to run any pro-active fault detection algorithms. Thus, the client MEP 60 is configured to not perform any fault detection based on loss of CFM frames from any remote CPE.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), Digital Signal Processing chips, or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

Figure 3:
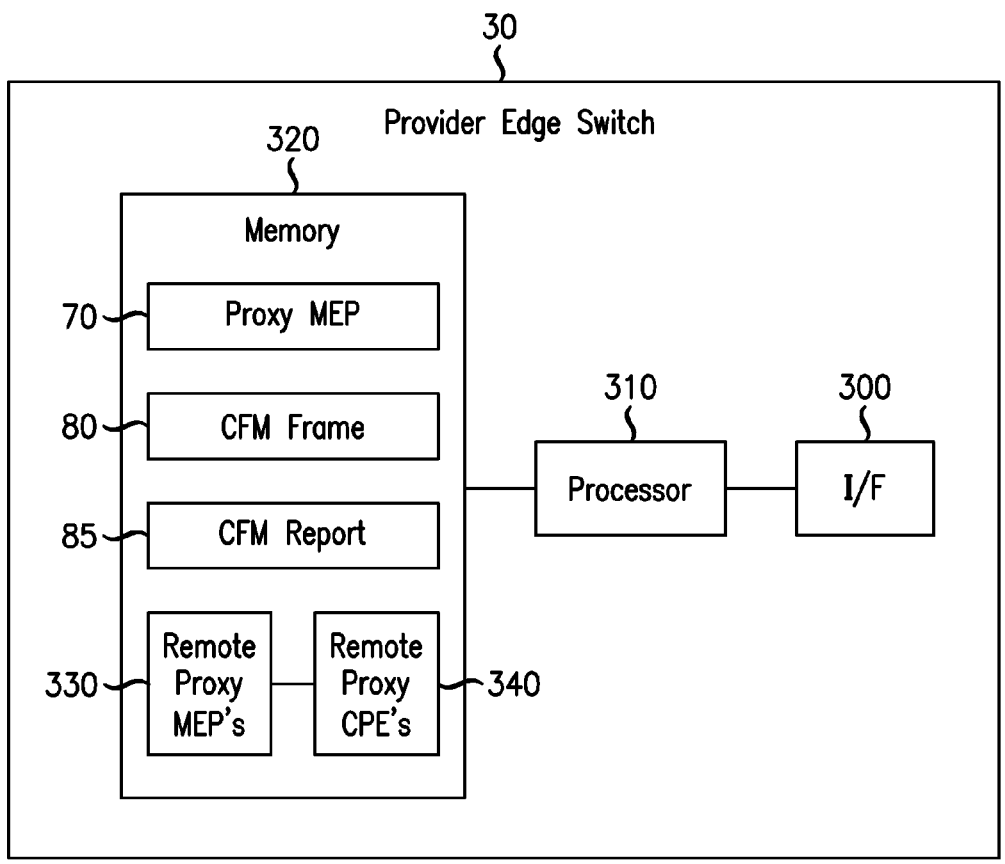
FIG. 3 is a block diagram illustrating exemplary functionality of a proxy maintenance endpoint within a provider edge switch, in accordance with embodiments of the present invention.

FIG. 3 is a block diagram illustrating exemplary components of a provider edge switch 30, in accordance with embodiments of the present invention. The provider edge switch 30 includes an interface 300, a processor 310 and a memory 320. The interface 300 (e.g., a network interface) is coupled to a downstream Ethernet link to connect to a plurality of downstream customer premises equipment and to an upstream Ethernet link to connect to a service provider network of a MAN.

The memory 320 includes the proxy maintenance endpoint (MEP) 70 and the processor 310 is coupled to the memory 320 to execute the proxy MEP 70. For example, the processor 310 can execute the proxy MEP 70 to create and configure the proxy MEP 70 as a designated proxy MEP for one or more downstream CPE. In addition, the processor 310 can execute the proxy MEP 70 to receive and process requests from client MEPs on the downstream CPEs to register with the proxy MEP 70.

Upon receiving a CFM CCM frame 80 from a registered client MEP on a downstream CPE, the processor 310 can further execute the proxy MEP 70 to store the CFM frame 80 within memory 320 and to encapsulate the CFM information in the CFM frame 80 within a CFM Report 85. The processor 310 can further execute the proxy MEP 70 to transmit the CFM Report 85 to peer proxy MEPs on remote provider edge switches within the MAN via interface 300 using CFM MAC addresses with a new message type, as described in more detail below in connection with FIGS. 4A-4C.

In an exemplary embodiment, the CFM Report 85 includes CFM information from multiple CFM frames 80. For example, the processor 310 can store CFM frames 80 received from one or more registered client MEPs over a predetermined period of time and encapsulate the CFM information from each of the received CFM frames 80 into the CFM Report 85. The predetermined period of time can correspond to, for example, a transmission frequency of CFM Reports 85 by the provider edge switch 30 to remote proxy MEPs on remote provider edge switches within the MAN. The transmission frequency is configurable per provider edge switch and/or MAN, and is at a reduced rate in comparison to normal CFM CCM frames. In an exemplary embodiment, the transmission frequency is less than 10 packets per second, and in some embodiments, may be less than or equal to 1 packet per second.

In addition, upon receiving a CFM Report 85 from a remote proxy MEP via interface 200, the processor 310 can execute the proxy MEP 70 to transmit the received CFM Report 85 and/or the CFM information in the CFM Report 85 to downstream registered client MEPs. For example, the processor 310 can de-capsulate the CFM Report 85 to extract the CFM information and transmit the CFM information in a new message to the downstream registered client MEPs.

The provider edge switch 30 may further maintain a list 330 of remote proxy MEPs (remote provider edge switches), and associate each remote proxy MEP with a list 340 of remote client MEPs (remote CPEs) stationed behind that remote proxy MEP, within memory 320. As used herein, the term "remote client MEPs" refers to any client MEP running on a CPE within the MAN. Likewise, the term "remote proxy MEP" refers to any proxy MEP running on a provider edge switch within the MAN. The processor 310 can perform an audit check on the list 340 of remote client MEPs using received CFM reports 85 from remote proxy MEPs to remove remote client MEPs from the list 340 that are not included in the received CFM reports 85 and add remote client MEPs to the list 340 that are included in the received CFM reports 85. The lists 330 and 340 of remote proxy and client MEPs may enable the service provider to more quickly and clearly identify and isolate remote provider edge switches associated with CPE that are experiencing problems in the MAN.

An example of a CFM Report Header is shown in FIGS. 4A-4C. In this example, the CFM Report is a CCM Frame 400 that includes a Common CFM Header field 410, which indicates a new message type 440 in an Opcode field 430. As shown in FIG. 4C, the new message type may be, for example, "Continuity Check Message (CCM)-Proxy MEP encoded." The CCM Frame Header 400 also includes an additional field 420 that indicates the number of encoded messages (e.g., CFM information) included in the CCM Frame 400.

Figure 5:
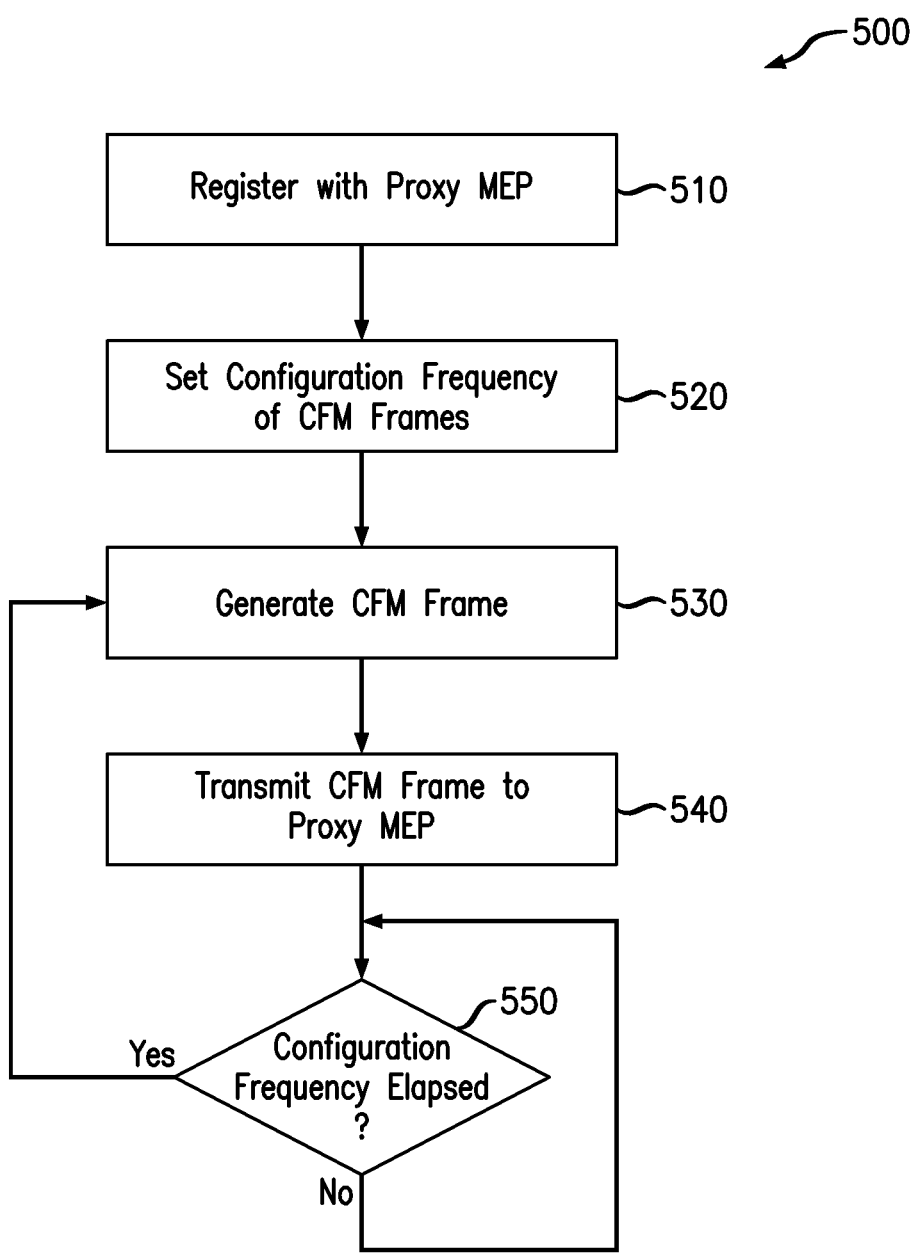
FIG. 5 is a flowchart illustrating an exemplary process for generating and transmitting CFM frames from a client maintenance endpoint to a proxy maintenance endpoint, in accordance with embodiments of the present invention.

FIG. 5 is a flowchart illustrating an exemplary process 500 for generating and transmitting CFM frames from a client MEP to a proxy MEP, in accordance with embodiments of the present invention. The process begins at 510, where the client MEP registers with the proxy MEP on the provider edge switch coupled to the CPE hosting the client MEP. At 520, the client MEP determines the frequency at which CFM CCM frames will be sent to the proxy MEP. The frequency may be set, for example, based on the type or location of the CPE and/or based on the network configurations for the MAN. At 530, the client MEP generates a CFM CCM frame, and at 540, the client MEP transmits the CFM CCM frame to the proxy MEP. At 550, a determination is made whether the configurable transmission frequency of the CFM CCM frames has elapsed. If so, the client MEP generates and transmits another CFM CCM frame to the proxy MEP at 530 and 540.

Figure 6:
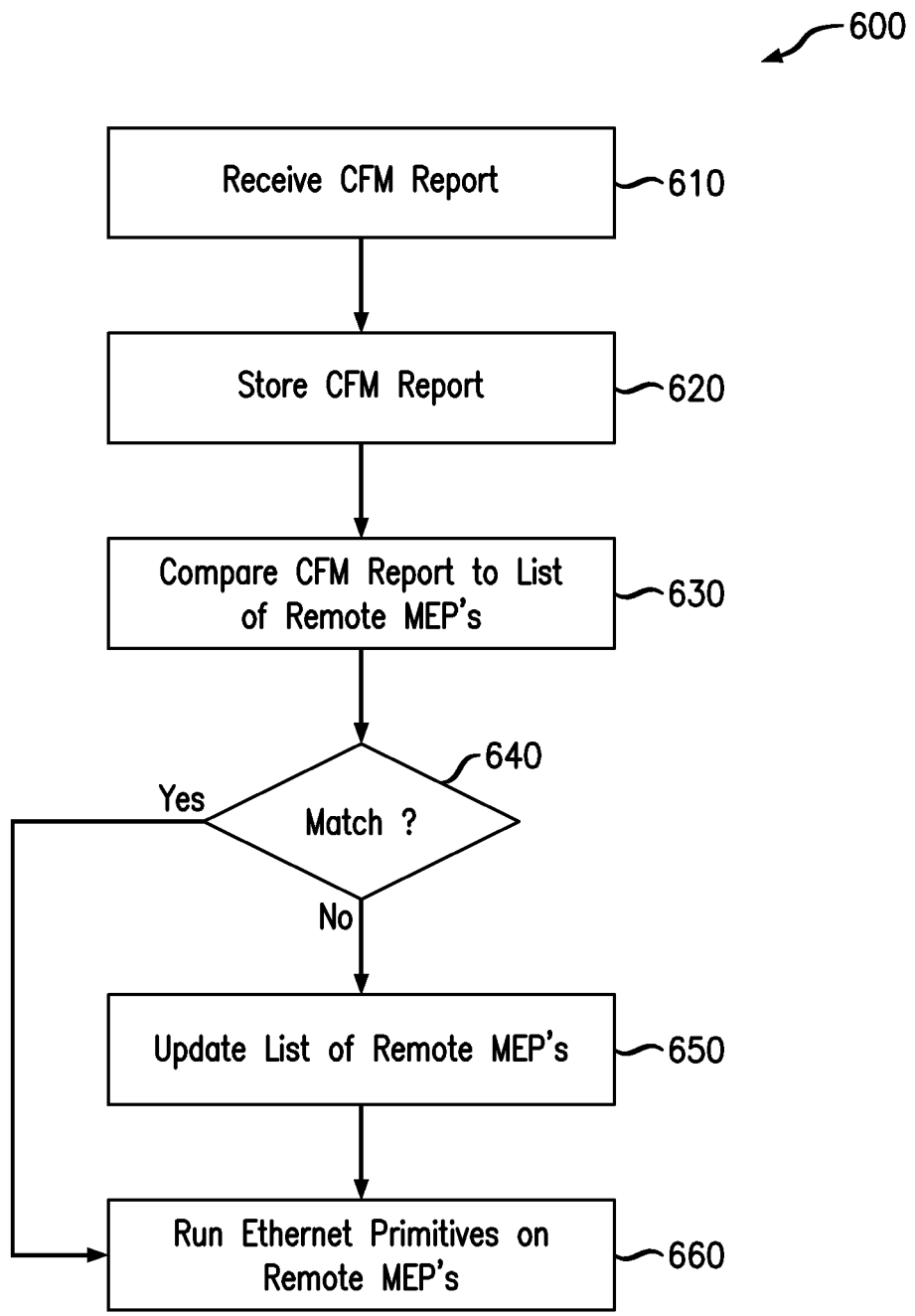
FIG. 6 is a flowchart illustrating an exemplary process for receiving and processing a CFM report at a client maintenance endpoint, in accordance with embodiments of the present invention.

FIG. 6 is a flowchart illustrating an exemplary process 600 for receiving and processing a CFM report at a client MEP, in accordance with embodiments of the present invention. The process begins at 610, where the client MEP receives a CFM Report from its designated proxy MEP. The client MEP stores the received CFM Report at 620, and at 630, the client MEP compares the CFM information in the CFM Report to a list of remote client MEPs maintained on the client MEP. At 640, a determination is made whether the received CFM information matches the list of remote client MEPs. If not, at 650, the client MEP updates the list of remote client MEPs. If so, at 660, the client MEP can run other Ethernet primitives, such as loop-back and link trace on the remote MEPs.

Figure 7:
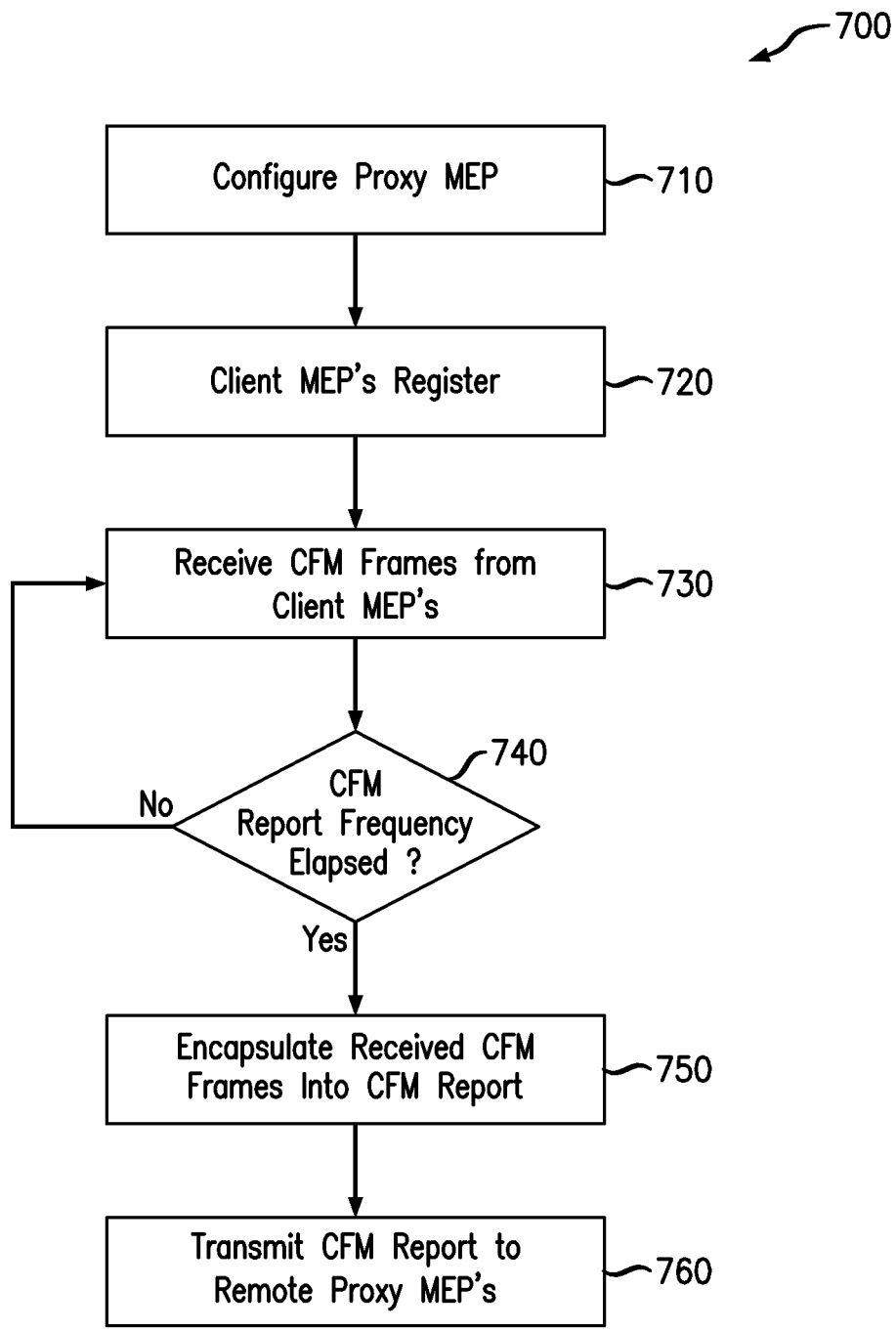
FIG. 7 is a flowchart illustrating an exemplary process for generating and transmitting a CFM report at a proxy maintenance endpoint, in accordance with embodiments of the present invention.

FIG. 7 is a flowchart illustrating an exemplary process 700 for generating and transmitting a CFM report at a proxy MEP, in accordance with embodiments of the present invention. The process begins at 710, where the proxy MEP is configured on a provider edge switch coupled to one or more downstream CPE. During configuration, the frequency at which CFM Reports will be sent to remote proxy MEP on remote provider edge switches is determined. The frequency may be set, for example, based on the type or location of the downstream CPE, the CFM CCM transmission frequency of the downstream CPE and/or based on the network configurations for the MAN. In some embodiments, the transmission frequency of CFM Reports may be updated periodically by the service provider or dynamically (and automatically) as new downstream CPE are added to the MAN.

At 720, the client MEPs on the downstream CPE register with the proxy MEP. At 730, the proxy MEP receives CFM CCM frames from one or more of the client MEPs. At 740, a determination is made whether the CFM Report transmission frequency has elapsed. If not, at 730, the proxy MEP continues to receive CFM CCM frames from the client MEPs. If so, at 750, the proxy MEP encapsulates the CFM information in the received CFM CCM frames into a CFM Report, and at 760, transmits the CFM Report to the remote proxy MEPs in the MAN.

Figure 8:
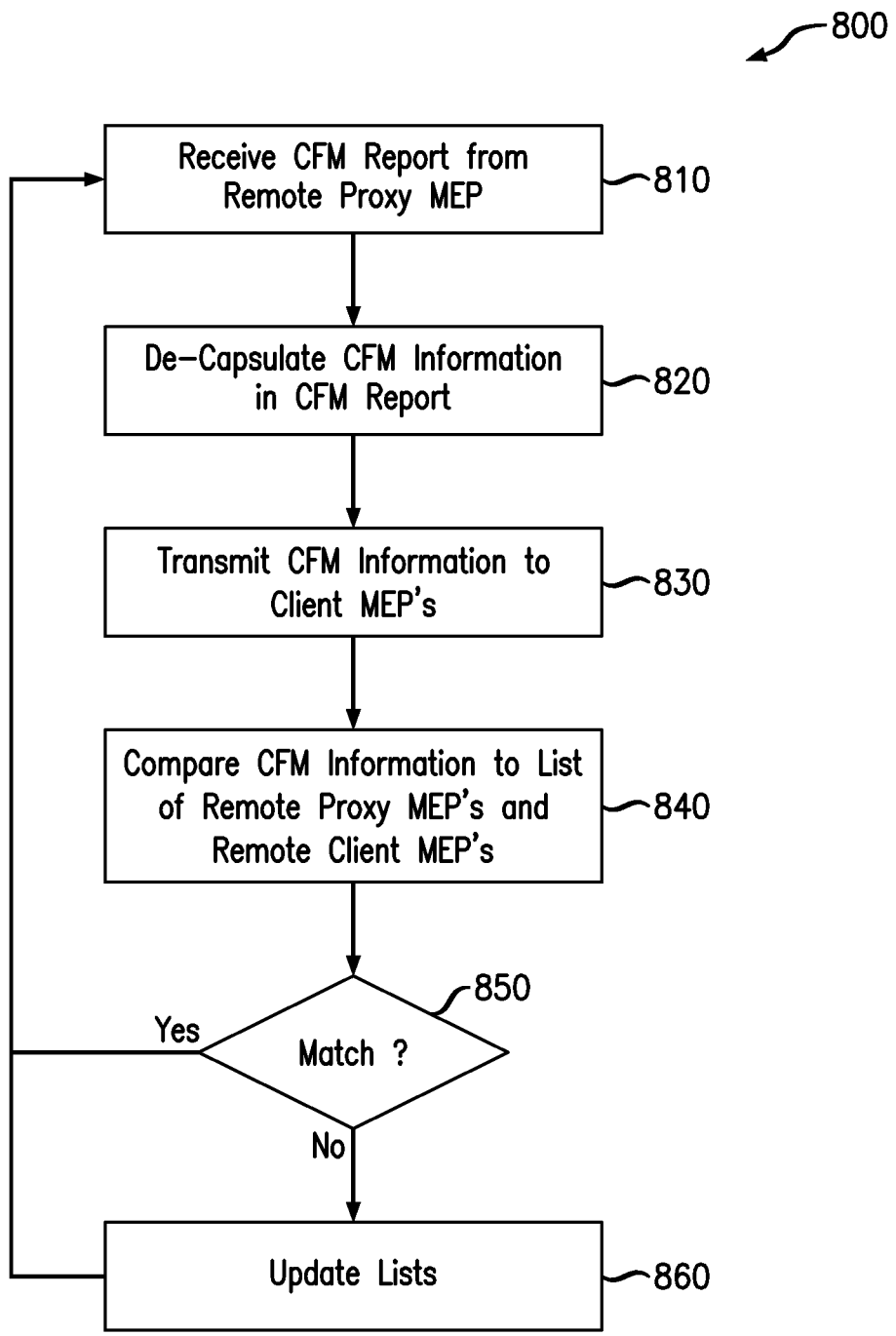
FIG. 8 is a flowchart illustrating an exemplary process for receiving and processing a CFM report at a proxy maintenance endpoint, in accordance with embodiments of the present invention.

FIG. 8 is a flowchart illustrating an exemplary process 800 for receiving and processing a CFM report at a proxy MEP, in accordance with embodiments of the present invention. The process begins at 810, where the proxy MEP receives a CFM Report from a remote proxy MEP within the MAN. At 820, the proxy MEP de-capsulates the CFM information in the CFM Report, and at 830, transmits the CFM information to registered downstream client MEPs. At 840, the proxy MEP further compares the CFM information in the CFM Report to a list of remote proxy MEPs and their associated remote client MEPs. At 850, a determination is made whether the CFM information in the CFM Report matches the list of remote proxy MEPs and their associated remote client MEPs. If not, the proxy MEP updates the list of remote proxy MEPs and their associated remote client MEPs. The process repeats at 810.

As will be recognized by those skilled in the art, the innovative concepts described in the present application can be modified, varied and adapted over a wide range of applications. Accordingly, the scope of the subject matter is not limited to any of the specific exemplary teachings discussed, but is instead defined by the following claims.

The invention claimed is:

1. An apparatus, comprising:
an interface coupled to a service provider network via an Ethernet link; and
a processor for registering with a designated proxy maintenance endpoint within the service provider network, transmitting Connectivity Fault Management (CFM) frames to the designated proxy maintenance endpoint and receiving a CFM report from the designated proxy maintenance endpoint via the interface, the CFM report including a plurality of additional CFM frames, each originated by a respective one of a plurality of remote customer premises equipment.

2. The apparatus of claim 1, further comprising:
a memory for storing the CFM report.

3. The apparatus of claim 2, wherein the memory further maintains a list of the plurality of remote customer premises equipment.

4. The apparatus of claim 3, wherein the processor performs an audit check on the list using the CFM report to remove ones of the remote customer premises equipment from the list that are not included in the CFM report and add ones of the remote customer premises equipment to the list that are included in the CFM report.

5. The apparatus of claim 1, wherein the apparatus is configured to not perform any fault detection based on loss of CFM frames from individual ones of the plurality of remote customer premises equipment.

6. The apparatus of claim 1, wherein the processor further generates and transmits a link trace message via the interface to one or more of the plurality of remote customer premises equipment using the CFM report.

7. The apparatus of claim 1, wherein the processor further generates and transmits a loop-back message via the interface to one or more of the plurality of remote customer premises equipment using the CFM report.

8. The apparatus of claim 1, wherein the processor transmits the CFM frames to the designated proxy maintenance endpoint at a configurable frequency.

9. The apparatus of claim 1, wherein the processor further runs an auto-discovery algorithm to register with the designated proxy maintenance endpoint.

10. The apparatus of claim 1, wherein the CFM frames are continuity check messages.

11. The apparatus of claim 1, wherein the apparatus is a customer premises equipment and the Ethernet link is a metro link that couples the customer premises equipment to a provider edge switch including the designated proxy maintenance endpoint.

12. A provider edge switch, comprising:
an interface coupled to a plurality of customer premises equipment via a downstream Ethernet link and to a service provider network via an upstream Ethernet link, the interface for receiving, via the downstream Ethernet link, respective Connectivity Fault Management (CFM) frames from the plurality of customer premises equipment;
a memory maintaining a proxy maintenance endpoint algorithm; and
a processor for executing the proxy maintenance endpoint algorithm to:
create a designated proxy maintenance endpoint for the plurality of customer premises equipment;
generate a CFM report and encapsulate all of the CFM frames received from the plurality of customer premises equipment into the CFM report; and
transmit the CFM report to remote proxy maintenance endpoints within the service provider network via the upstream Ethernet link.

13. The provider edge switch of claim 12, wherein the interface further receives an additional CFM report from one of the remote maintenance endpoints, the additional CFM report including a plurality of additional CFM frames, each originated by a respective one of a plurality of remote customer premises equipment.

14. The provider edge switch of claim 13, wherein the plurality of additional CFM frames are included within encapsulated CFM information in the CFM report.

15. The provider edge switch of claim 14, wherein the processor further de-capsulates the encapsulated CFM information to produce de-capsulated CFM information and provides the de-capsulated CFM information to the plurality of customer premises equipment via the downstream Ethernet link.

16. The provider edge switch of claim 14, wherein the memory further includes a list of the remote proxy maintenance endpoints and the plurality of remote customer premises equipment associated with each of the remote maintenance endpoints and the processor updates the list based on the additional CFM report.

17. The provider edge switch of claim 12, wherein the CFM report includes a header having an opcode indicating that the CFM report is a continuity check message containing encapsulated CFM frames, the header further indicating a number of encapsulated CFM frames.

18. The provider edge switch of claim 12, wherein the processor further transmits the CFM report at a configurable frequency.

19. The provider edge switch of claim 17, wherein the configurable frequency is less than 10 packets per second.

20. The provider edge switch of claim 12, wherein the processor further receives the CFM frames from the plurality of customer premises equipment via the downstream Ethernet link at respective configurable frequencies such that timer validation checks are not performed.

* * * * *